United States Patent [19]
DeFreitas

[11] Patent Number: 5,870,100
[45] Date of Patent: Feb. 9, 1999

[54] FILLING OF GRAPHICAL REGIONS

[75] Inventor: Scott C. DeFreitas, Mountain View, Calif.

[73] Assignee: Compaq Computer Corporation, Houston, Tex.

[21] Appl. No.: 561,871

[22] Filed: Nov. 22, 1995

[51] Int. Cl.$^6$ ............................................ G06F 15/00
[52] U.S. Cl. ................................................ 345/429
[58] Field of Search ............................ 395/135, 133, 395/129; 345/429, 431

[56] References Cited

U.S. PATENT DOCUMENTS 5,594,850  1/1997  Noyama et al. .................. 395/135

OTHER PUBLICATIONS

Heckbert, Paul, "Graphic Gems: A Seed Fill Algorithm", (1990) Academic Press, Inc.; pp. 275–284, 721–722.

*Primary Examiner*—Phu K. Nguyen
*Attorney, Agent, or Firm*—Jenkens & Gilchrist

[57] ABSTRACT

A computer method for filling a selected region in a target image includes determining an attribute of a seed pixel within the selected region, forming a mask image of the region based on identifying pixels that have the attribute, and filling the selected region based on the mask image.

51 Claims, 8 Drawing Sheets

FILLING OF GRAPHICAL REGIONS

A source code listing of a computer program implementation of the invention, SeeFill.cpp, is attached as Appendix A and incorporated herein by reference.

BACKGROUND

The invention relates to filling of graphical regions.

Users of computer graphics programs often desire to fill a selected region of an image with other graphical information. For example, an architect using a designing program may want to fill only a selected rectangular area with a repeating brick pattern. This operation is called "seed filling". The general operation is suggested by FIG. 1. A target image 10 contains a region 12 that has been selected by a mouse click at a given pixel location 14. A fill image 16 (here, a repeating brick image) is to be placed within the boundary 15 of selected region 12, but not within the boundary 17 of some similar but unselected region 18.

Figure 1:
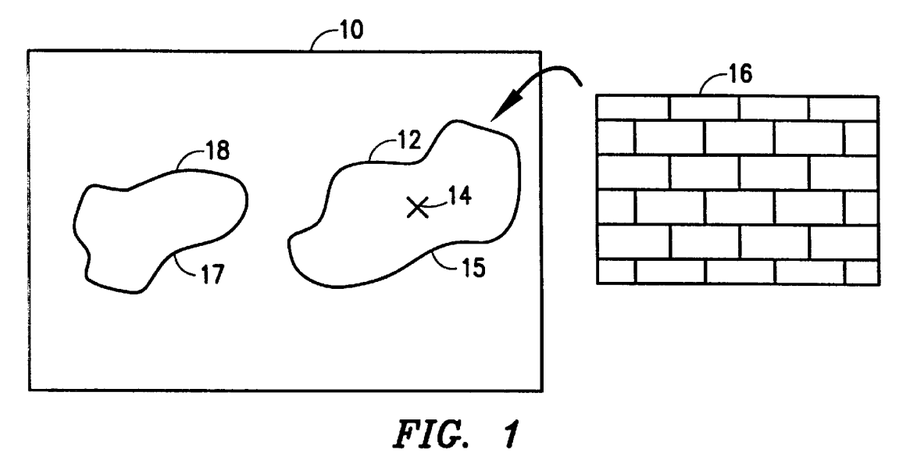
FIG. 1 is a diagram of a graphical region filling operation.

When a selected region has already been defined, for example by defining its boundary, seed filling the region is straightforward: a given fill image is placed within the defined boundary of the selected region of the target image. A more difficult problem arises when the given selected region is not defined by a specific boundary, but rather, for example, constitutes a contiguous (or piece-wise continuous) bitmap region defined by all its pixels being a given color and each pixel being connected to at least one other pixel of the region. With piece-wise continuous bitmap regions, the extent of region 12 normally must be determined before filling is done.

Figure 2:
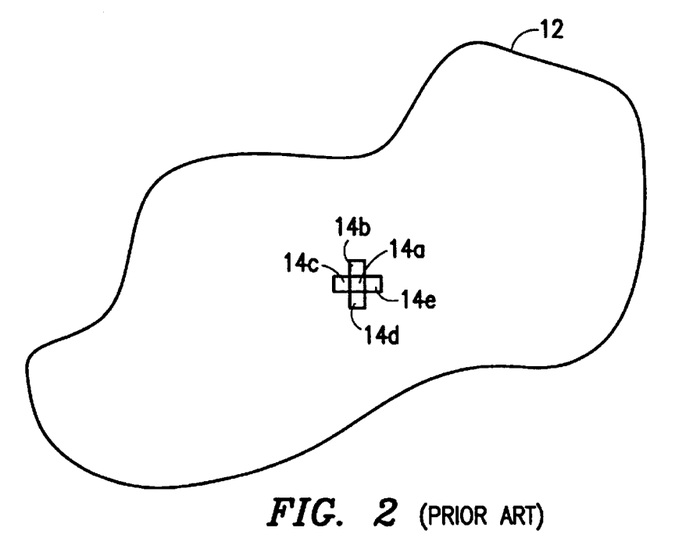
FIG. 2 is a diagram of a four-connected-pixel method of determining the boundary of a region.

One way to determine the extent of region 12 is by a methodical search that begins at pixel location 14 (called the seed) and looks for all similar (e.g., similarly colored) pixels. Referring to FIG. 2, for example, if region 12 comprised blue pixels, the colors of the four pixels 14b, 14c, 14d, and 14e connected to seed pixel 14a would be determined. For each such connected pixel that has the same color (blue) as 14a, the colors of its remaining three connected pixels would also be determined (the color of pixel 14a need not be determined because its color is already known). This process continues until all connected pixels having the same given attribute as initial pixel 14a (blue color in this case) have been found, and used to place fill image 16 into region 12. For example, as each pixel 14 is tested, it can be immediately replaced with an appropriate pixel of fill image 16.

This four-connected pixel approach takes a significant amount of time. In many graphical operating systems, for example Microsoft™ Windows™, each interrogation of a pixel for its color involves calling a specific device driver that governs its own device-dependent bitmap (DDB) of the image. More generally, one requests the graphical device interface (GDI) layer of an operating system for information about a particular pixel in a bitmap. Each call takes a finite time and the aggregate time for the calls increases geometrically with the size of the selected region.

Some computer systems allow for device-independent bitmaps (DIBs), which do not require so many separate calls to the GDI. However, these systems may use a DDB as a master for output to a device (e.g., monitor), and can require a relatively time-consuming translation step from the DBB to a DIB for direct manipulation by a particular program, and then back again.

SUMMARY

In one aspect of the invention, a computer method for filling a selected region in a target image includes determining an attribute of a seed pixel within the selected region, forming a mask image of the selected region based on identifying pixels that have the attribute, and filling the selected region based on the mask image.

Embodiments of the invention include the following features. The selected region can be piece-wise continuous or discontinuous. The attribute can be a color, and can be represented by at least one settable bit, which can represent a value of chroma, hue, luminance, or a time-variant change of a characteristic, of the seed pixel.

The mask image can include a first set of mask colors corresponding to pixels within the selected region, and a second set of mask colors corresponding to other pixels in the target image. The first set of mask colors can be a single first mask color, and the second set of mask colors can be a single second mask color. As one example, the first mask color can be black or white, where the second mask color can be opposite, that is, white or black.

The selected region can be filled using a fill image. The filling of the selected region can include combining values of the pixels in the target image, the fill image, and the mask image. The filling can include forming a first combined image from the fill image and the target image, forming a second combined image from the first combined image and the mask image, and forming the target image, having the selected region filled with the fill image, by using the second combined image and the fill image. The filling steps can include mathematical operations on the target image, the fill image and the mask image. A first mathematical operation can include exclusive ORing the target image and the fill image. A second mathematical operation can include ANDing the first combined image and the mask image. A third mathematical operation can include exclusive ORing the second combined image and the fill image.

The invention can include creating a preliminary mask image from a first set of preliminary mask colors corresponding to pixels of the target image having the attribute and from a second set of preliminary mask colors corresponding to other pixels of the target image. The first set of preliminary mask colors can comprise a single first preliminary mask color and the second set of preliminary mask colors can comprise a single second preliminary mask color. The mask image can be created from a first set of mask colors corresponding to pixels in the target image within the selected region and a second set of mask colors corresponding to other pixels of the target image. The first set of mask colors can be a single first mask color, with the second set of mask colors being a single second mask color. For example, the first preliminary mask color can be white, the second preliminary mask color can be black, the first mask color can be black and the second mask color can be white. Or, the foregoing colors can be reversed.

A bit block transfer function can convert the target image into the preliminary mask image, in one embodiment forming a monochrome image. The bit block transfer function can assign all pixels sharing the attribute to a set of background colors, and all other pixels to a set of foreground colors, or vice versa. As one example, the background color can be white, and the foreground color can be black, or vice versa.

The mask image can be generated by determining a piece-wise continuous selected region of pixels of the preliminary mask image having a set of the same colors. The set of same colors can be a single same color. For example, the same color can be white or black.

In another aspect of the invention, apparatus for filling a graphical region includes a fill processor, a target image storage area, and a mask storage area, the target image storage area and the mask storage area being coupled to the fill processor.

Embodiments of the invention include the following features. The apparatus can include a fill image storage area and/or a preliminary mask storage area coupled to the fill processor. The storage areas can be regions of memory. The fill processor can be a computer program stored in a region of memory. The apparatus can include a region selection device coupled to the fill processor, for example, a computer mouse. The apparatus can include a display coupled to the fill processor.

Among other advantages, the use of a single masking step allows the selected region of the target image to be filled quickly and accurately without time consuming pixel-by-pixel calculations. In addition, using a single-step conversion from a device-dependent bitmap into a device-independent monochrome bitmap allows a quick and straightforward generation of the mask. Relatively large groups of pixels can then be checked simultaneously to determine the outermost boundaries of the region to be masked.

Other advantages and features will become apparent from the following description and from the claims.

DESCRIPTION

A sample seed filling program listing (SeedFill.cpp), written in C, is provided in Appendix A. The following description will refer to procedure and function names used in SeedFill.cpp.

Figure 3A:
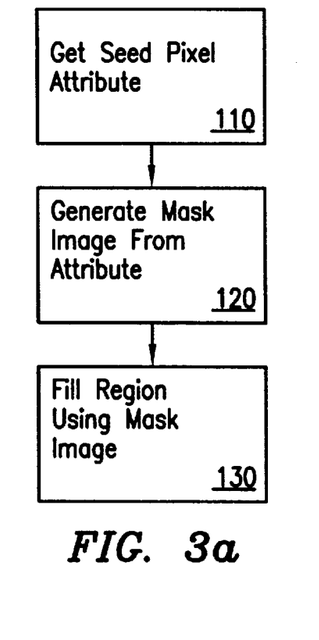
FIGS. 3a, 3b, and 3c are flow charts of the graphical region filling method.

Referring to FIGS. 1, and 3a through 3c, once a region 12 has been selected, for example by a mouse click at pixel location 14, the particular color of the pixel (i.e., the seed pixel at location 14) is retrieved (Step 110). In the BJI_CalcFillMask procedure of SeedFill.cpp, this step is:

ov=GetPixel(hdcBM, x, y)).

Figure 3B:
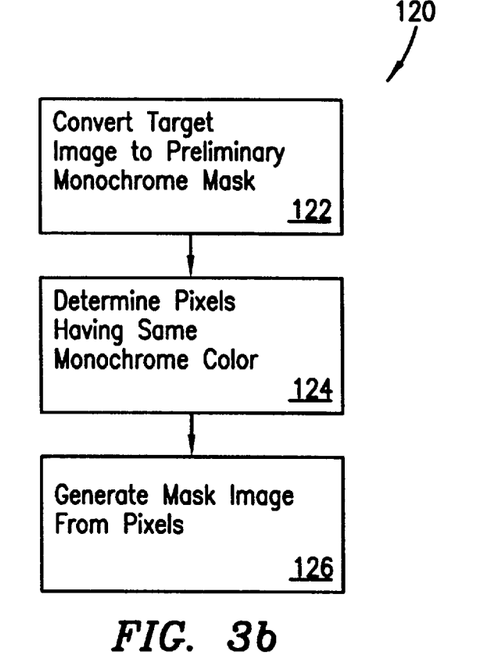
Figure 3C:
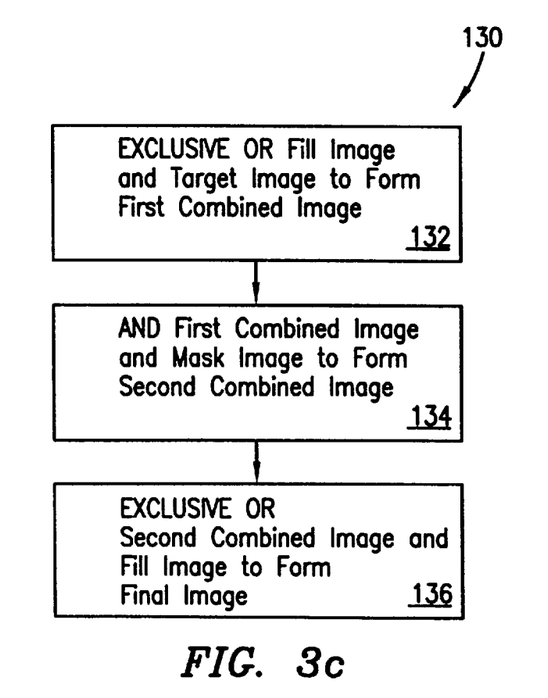

Next, a mask is generated by using this fetched color attribute (Step 120). To accomplish this, the procedure first calls the GDI (more particularly, the device driver) to convert (in a simple single step) the current bitmap into a monochrome image (Step 122). To perform this conversion, the value of the current background color is fetched and saved. Then, the background color is set equal to the color of the current pixel:

SetBkColor (hdcBM, (0x02000000| ov)).

Finally, the color bitmap is converted to a monochrome mask, where every pixel with the same color as the seed color is converted to white (the standard background color) and every other pixel converts to black:

BitBlt (maskDC, 0, 0, winWidth, winHeight, hdcBM, 0, 0, SCRCOPY).

Figure 4A:
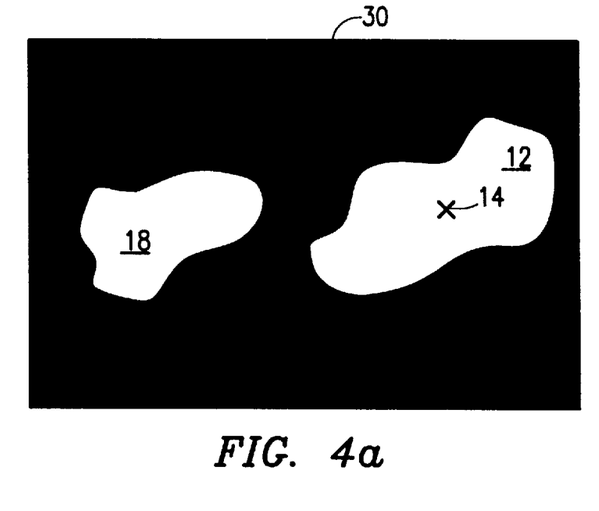
FIGS. 4a, 4b, and 4c are diagrams of a preliminary mask image.

The resulting monochrome preliminary mask 30 (maskDC) is shown in FIG. 4a, where both regions 12 and 18, sharing the same colors, have been converted to the background color white (in Windows™ represented by a pixel word having all ones), while all other colors have been converted to the foreground color black.

Figure 4B:
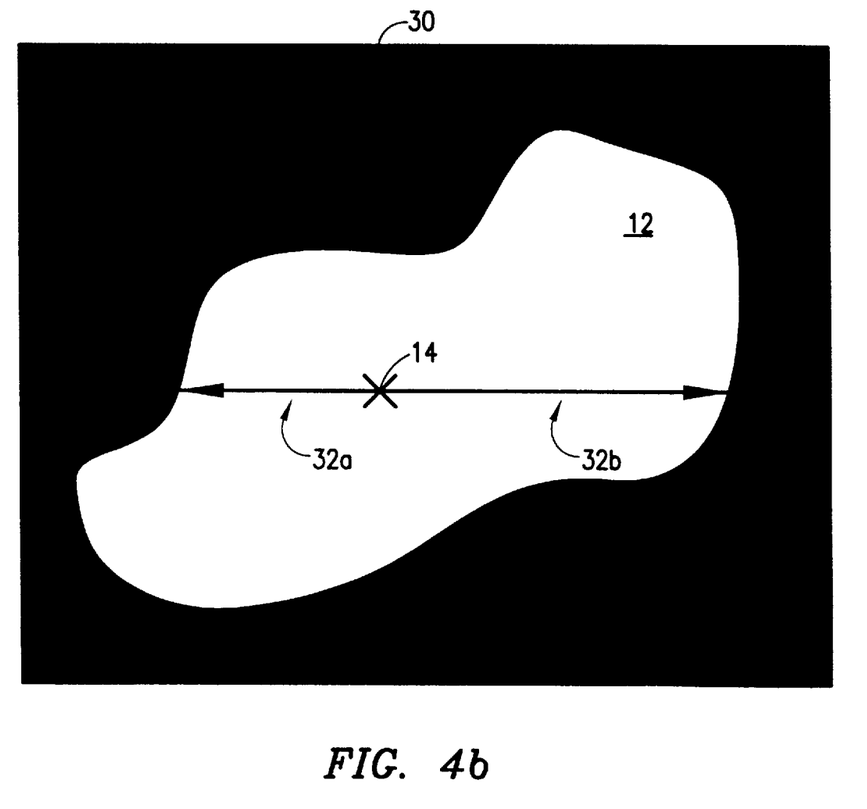
Figure 4C:
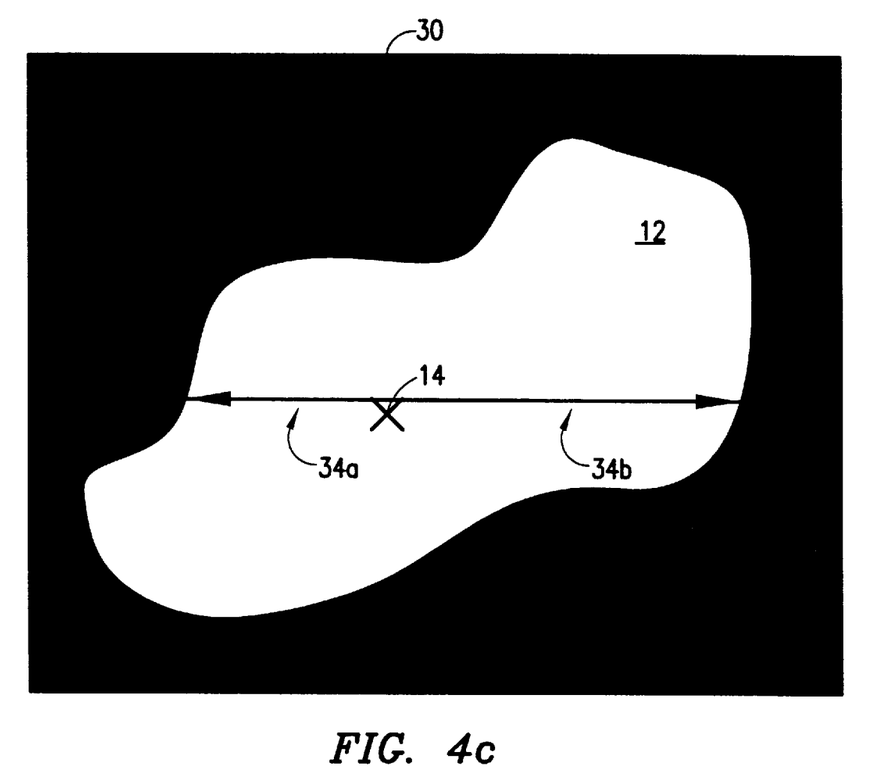

Next, the pixels of region 12 of preliminary mask 30 are interrogated to produce a mask having only region 12 as black and the rest of the mask area white. Referring to FIGS. 4b and 4c, starting at the selected pixel 14, linear pixel runs 32a and 32b are made in both directions until black pixels are found, defining boundaries of that line (Step 124). Since the inner pixels, being white, have very simple expressions (here, all ones), the pixel runs can be scanned very quickly: bytes or words at a time. These pixel runs significantly reduce the number of memory accesses required to generate the mask. For example, if white is represented by a single bit "1", a byte-long word of white pixels——1 1 1 1 1 1 1 1—— can be quickly compared to a word taken from a given row, e.g., ——1 1 1 1 0 1 1 1——. When the existence of a non-white pixel is then discovered within the word, the word can then be broken into smaller units (for example, 0 1 1 1) for closer inspection until the exact location of the non-white boundary is found. The next pixel row up or down (34a and 34b) can be inspected thereafter, and so on.

Figure 5A:
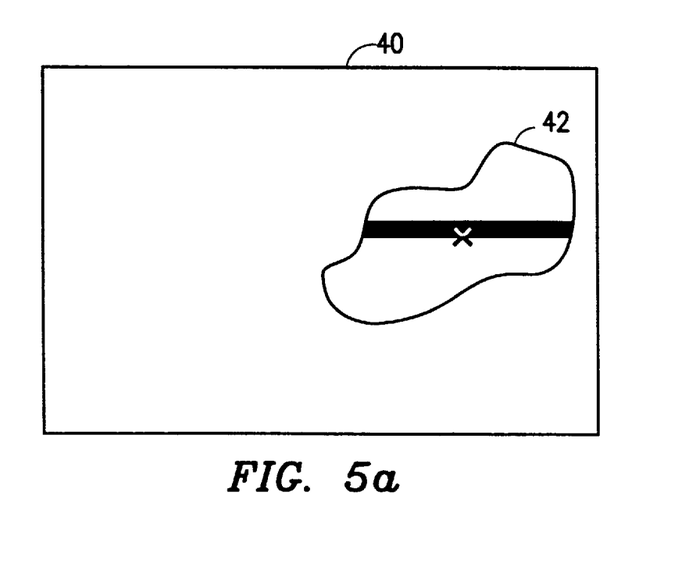
FIGS. 5a, 5b, and 5c are diagrams of a mask image.
Figure 5B:
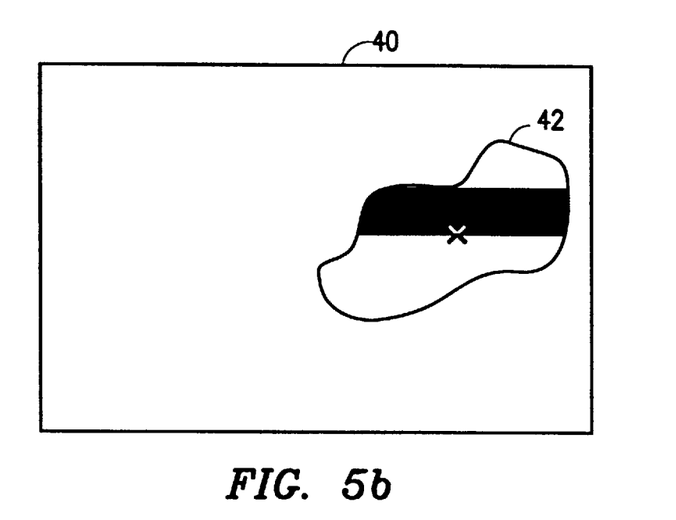
Figure 5C:
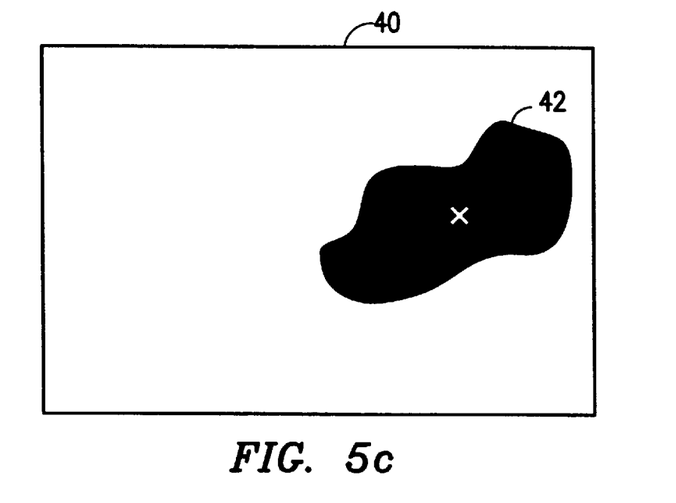
Figure 6:
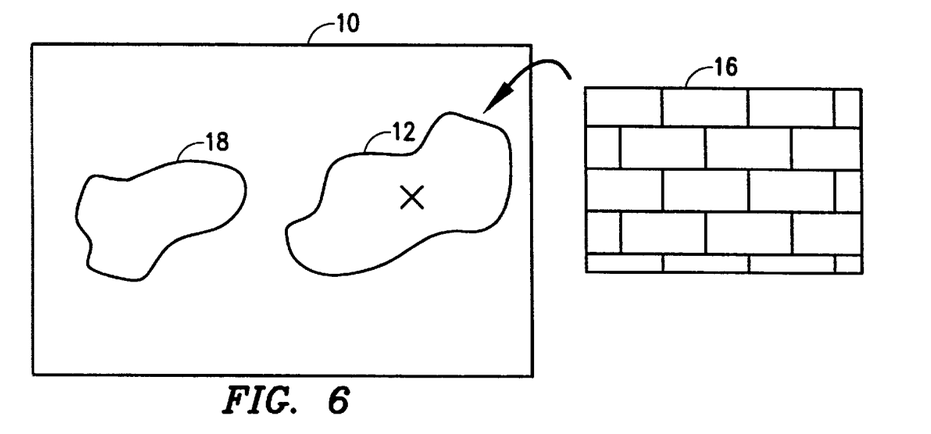
FIG. 6 is a diagram of the target image, having the selected region, and the fill image.
Figure 7:
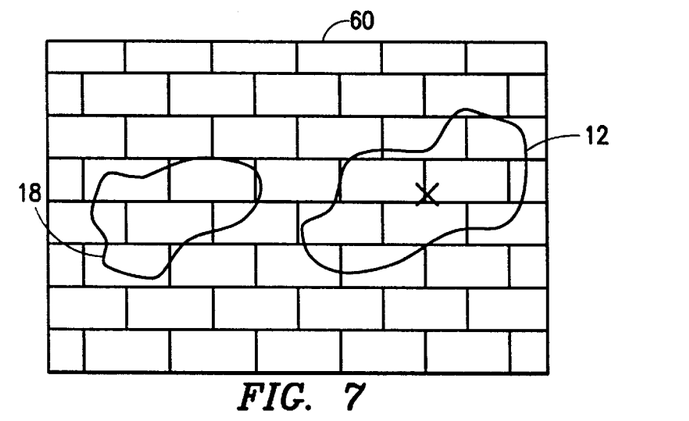
FIG. 7 is a diagram of the first combined image.

As each row is inspected, the addresses of all found white pixels are used to construct mask 40, FIG. 5a. Region 42 of mask 40, corresponding to selected region 12 of target image 10, is methodically "filled" with black pixels (represented by all zeroes) as each pixel run is scanned, as in FIGS. 5a through 5c. Once all pixel runs have been scanned, FIG. 5c, mask 40 is completed (Step 126). This mask 40 can then be used to block transfer fill image 16 into selected region 12 of target image 10 (Step 130). The boundaries of region 42 can be also provided, to optimize the filling of the selected region, as described below.

Referring to FIGS. 6 through 11, a block transfer procedure begins with target image 10 (having selected region 12), and fill image 16. First, fill image 16 is block transferred across the entire target image 10, tiling if necessary, providing first combined image 60 of FIG. 7. This can be accomplished by exclusive ORing all of the bits of fill image 16 with the bits of target image 10 (Step 132). To optimize this process, if the boundaries of region 42 of mask 40 are provided, fill image 16 can be efficiently tiled only over the rough extent of selected region 12, rather than the entire area of target image 10.

Figure 8:
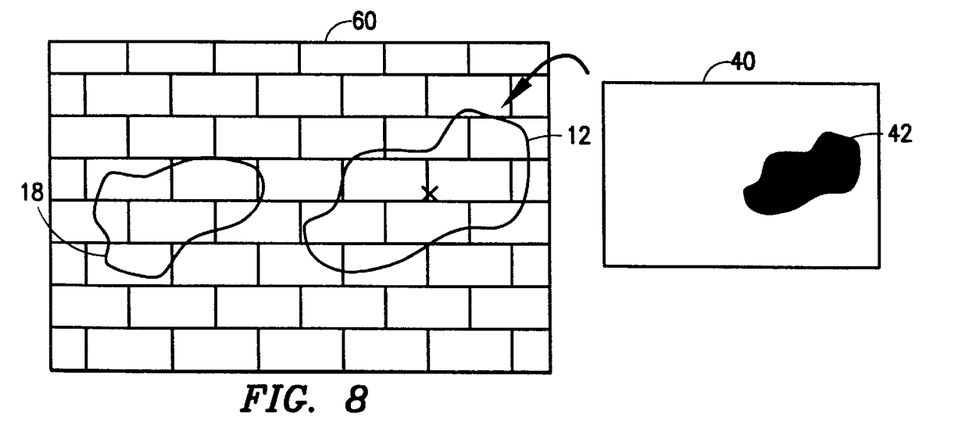
FIG. 8 is a diagram of the first combined image and the mask image.
Figure 9:
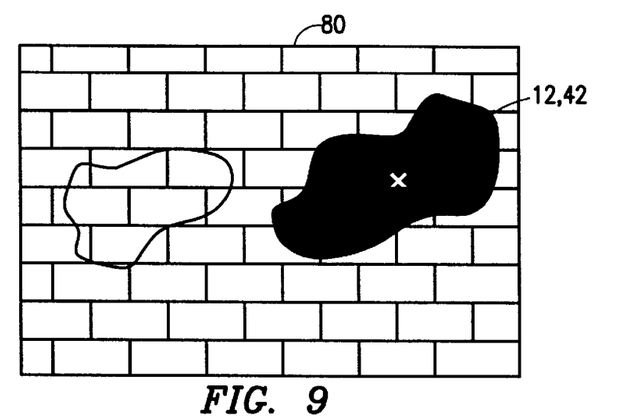
FIG. 9 is a diagram of the second combined image.

Next, mask 40, with mask region 42 is ANDed with first combined image 60, as in FIG. 8, to produce the second combined image 80 of FIG. 9 (Step 134). Second combined image 80 (temporarily) has fill image 16 superimposed everywhere except in region 12, now made black by mask region 42.

Figure 10:
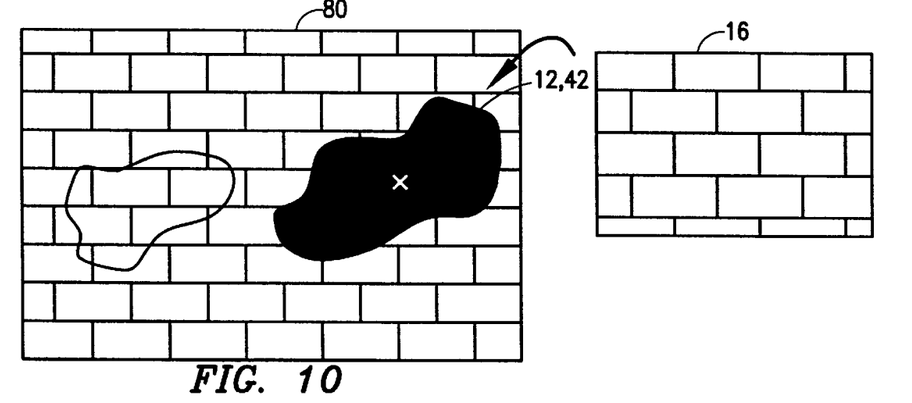
FIG. 10 is a diagram of the second combined image and the fill image.
Figure 11:
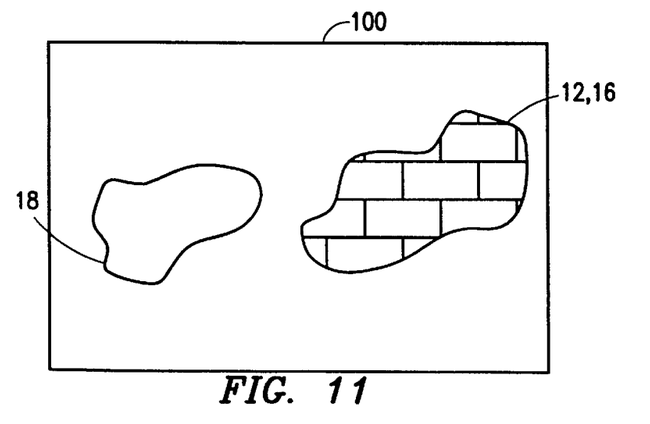
FIG. 11 is a diagram of the target image with the selected region filled with the fill image.

The target image is corrected by once again exclusive ORing fill image 16 with second combined image 90 (again, tiling when necessary), as in FIG. 10 (Step 136). The resulting image 100, FIG. 11, has selected region 12 properly filled with fill image 16, while region 18 remains as it was, even if region 18 had the same color attributes as selected region 12.

Figure 12:
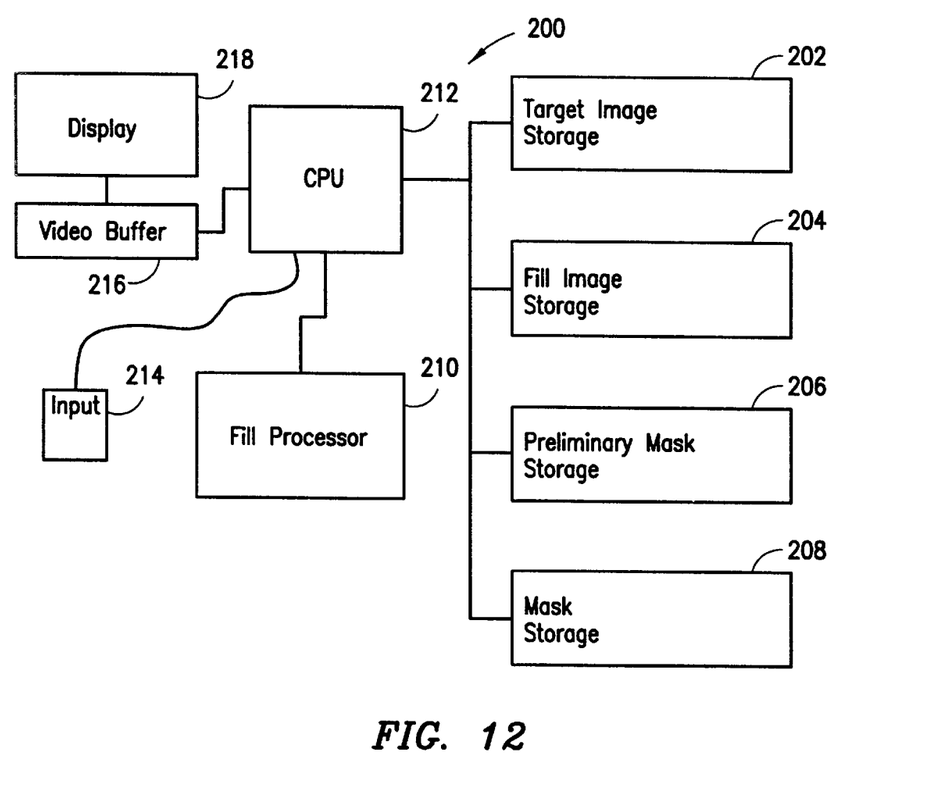
FIG. 12 is a schematic diagram of seed filling apparatus.

Referring to FIG. 12, apparatus 200 for filling graphical regions includes a target image storage area 202 (formed, for example, of DRAM memory), a fill image storage area 204, a preliminary mask storage area 206, and a mask storage area 208. Target image 10, fill image 16, preliminary mask 30 and mask 40 are stored in respective storage areas 202 through 208. Fill processor 210 (that can be a computer program such as SeedFill.cpp stored in RAM, a firmware program, or a hardware implementation) controls CPU 212 to perform the filling operations discussed above. Selected region 12 is selected at pixel 14 by use of region selection device 214 (for example, a "mouse"). Once selected region 12 has been filled, the entire updated target image 10 can be transferred from target image storage 202 to video buffer 216 (or equivalent output memory buffer) for output on display 218 (for example, a computer video monitor).

Other embodiments are within the claims. For example, the attribute of the seed pixel used to define the selected region can be generalized to be any value assigned to a pixel, including values indicating blinking and other time-variant characteristics of the pixel, the chroma, hue, luminance of a pixel, and background values for grouping collections of pixels together, but having no immediate visible effect. Attributes can be represented by a settable bit or bits. The target image 10 can comprise bitmaps, vector images, and any combination of such images. The fill image 16 can also comprise combinations of these.

Mask interrogation (steps 124 and 126), where mask 40 is generated, can be performed, for example, by investigating only rows of pixels, only columns, in four-connected pixel fashion, or in any combination of these. Both the preliminary mask 30 and mask 40 can be comprised of pixels belonging to a set of colors, where a set is defined to include a single member such as black or white. Other mathematical operations and other color schemes can be employed to combine the mask and the fill image with the target image (for example, in operating systems that assign the color white to be assigned the value 0, mask 40 could have a white mask area 42 against a black background). All images, including preliminary mask image 30, mask image 40, first and second combined images 60 and 80, etc., can be constructed and employed in the background and never displayed. "Pixel" is understood to mean a picture element in any sense, whether displayed or not, and whether coarse or fine, "image" is meant to encompass any one or more dimensioned collection of such pixels, and "color" can represent any value or values associated with a pixel.

The selected region 12 can be piece-wise continuous or discontinuous. For example, filling a window having four distinct panes with a landscape bitmap would require masking four discontinuous regions, but no others. A generalized selection method, whereby at least one pixel is selected in each grouped region, could then be used. Other embodiments are within the scope of the following claims.

What is claimed is:

1. A computer method for filling a selected region in a target image comprising:
   determining a color attribute of a seed pixel within the selected region;
   forming a mask image of the selected region based on identifying pixels within the selected region that have the color attribute; and
   filling the selected region based on the mask image.
2. The method of claim 1 wherein the selected region is piece-wise continuous.
3. The method of claim 1 wherein the selected region is piece-wise discontinuous.
4. The method of claim 1 wherein the attribute is represented by at least one settable bit.
5. The method of claim 4 wherein the at least one settable bit represents a value of chroma, hue, luminance, or a time-variant change of a characteristic, of the seed pixel.
6. The method of claim 1 in which the mask image includes a first set of mask colors corresponding to pixels within the selected region.
7. The method of claim 6 in which the mask image includes a second set of mask colors corresponding to pixels in the target image outside the selected region.
8. The method of claim 7 wherein the first set of mask colors comprises a single first mask color, and the second set of mask colors comprises a single second mask color.
9. The method of claim 8 wherein the first mask color is black.
10. The method of claim 8 wherein the first mask color is white.
11. The method of claim 8 wherein the first mask color is black, and the second mask color is white.
12. The method of claim 8 wherein the first mask color is white, and the second mask color is black.
13. The method of claim 6 wherein the first set of mask colors comprises a single first mask color.
14. The method of claim 1 in which the step of filling the selected region includes use of a fill image.
15. The method of claim 14 in which the filling step comprises combining values of the pixels in the target image, the fill image, and the mask image.
16. The method of claim 14 in which the filling step further comprises a first forming step wherein a first combined image is formed from the fill image and the target image.
17. The method of claim 16 in which the filling step further comprises a second forming step wherein a second combined image is formed from the first combined image and the mask image.
18. The method of claim 17 in which the filling step further comprises a third forming step wherein the target image, having the selected region filled with the fill image, is formed from the second combined image and the fill image.
19. The method of claim 18 wherein the third forming step comprises a mathematical operation on the second combined image and the fill image.
20. The method of claim 19 wherein the third mathematical operation comprises exclusive ORing the second combined image and the fill image.
21. The method of claim 17 wherein the second forming step comprises performing a second mathematical operation on the first combined image and the mask image.
22. The method of claim 21 wherein the second mathematical operation comprises ANDing the first combined image and the mask image.
23. The method of claim 16 wherein the first forming step comprises performing a first mathematical operation on the target image and the fill image.
24. The method of claim 23 wherein the first mathematical operation comprises exclusive ORing the target image and the fill image.
25. The method of claim 1 wherein the step of forming the mask image includes a first creating step wherein a preliminary mask image is created from a first set of preliminary mask colors corresponding to pixels of the target image having the attribute and from a second set of preliminary mask colors corresponding to other pixels of the target image.

26. The method of claim 25 wherein the first set of preliminary mask colors comprises a single first preliminary mask color and the second set of preliminary mask colors comprises a single second preliminary mask color.

27. The method of claim 25 wherein the step of forming the mask image includes a second creating step wherein the mask image is created from a first set of mask colors corresponding to pixels in the target image within the selected region and from a second set of mask colors corresponding to other pixels of the target image.

28. The method of claim 27 wherein the first set of mask colors comprises a single first mask color and the second set of mask colors comprises a single second mask color.

29. The method of claim 27 wherein the first and second sets of preliminary mask colors comprise respectively a single first preliminary mask color, and a single second preliminary mask color, and the first and second sets of mask colors comprise respectively a single first mask color and a single second mask color.

30. The method of claim 29 wherein the first preliminary mask color is white, the second preliminary mask color is black, the first mask color is black and the second mask color is white.

31. The method of claim 27 wherein the second creating step further comprises the steps of:

determining a piece-wise continuous selected region of pixels of the preliminary mask image having a set of same colors; and generating the mask image from the piece-wise continuous selected region of pixels.

32. The method of claim 31 wherein the set of same colors comprises a single same color.

33. The method of claim 32 wherein the same color is white.

34. The method of claim 32 wherein the same color is black.

35. The method of claim 25 wherein the first creating step comprises a bit block transfer function converting the target image into the preliminary mask image.

36. The method of claim 35 wherein the preliminary mask image comprises a monochrome image.

37. The method of claim 35 wherein the bit block transfer function assigns all pixels sharing the attribute to a set of background colors, and assigns all other pixels to a set of foreground colors.

38. The method of claim 37 wherein the set of background colors comprises a single background color, and the set of foreground colors comprises a single foreground color.

39. The method of claim 38 wherein the background color is white, and the foreground color is black.

40. The method of claim 38 wherein the background color is black, and the foreground color is white.

41. The method of claim 35 wherein the bit block transfer function assigns all pixels sharing the attribute to a foreground color, and assigns all other pixels to a background color.

42. The method of claim 41 wherein the background color is white, and the foreground color is black.

43. The method of claim 41 wherein the background color is black, and the foreground color is white.

44. Apparatus for filling a graphical region comprising:

a fill processor;

a target image storage area; and a mask storage area, wherein the target image storage area and the mask storage area are coupled to the fill processor, the mask storage area holding a mask formed by determining a color attribute of a seed pixel within a selected region, and forming the mask image of the selected region based on identifying pixels within the selected region that have the color attribute.

45. The apparatus of claim 44 further comprising a fill image storage area coupled to the fill processor.

46. The apparatus of claim 44 further comprising a preliminary mask storage area coupled to the fill processor.

47. The apparatus of claim 44 wherein the target image storage area and the mask storage area comprise regions of memory.

48. The apparatus of claim 44 wherein the fill processor comprises a computer program stored in a region of memory.

49. The apparatus of claim 44 further comprising a region selection device coupled to the fill processor.

50. The apparatus of claim 49 wherein the region selection device includes a computer mouse.

51. The apparatus of claim 44 further comprising a display coupled to the fill processor.

* * * * *